US012303921B2

(12) United States Patent
Fore

(10) Patent No.: US 12,303,921 B2
(45) Date of Patent: May 20, 2025

(54) MECHANICAL BREAKUP ACTUATOR WITH DISRUPTIVE VORTEX CHAMBER

(71) Applicant: PRECISION VALVE CORPORATION, Greenville, SC (US)

(72) Inventor: John B. Fore, Travelers Rest, SC (US)

(73) Assignee: Precision Valve Corporation, Greenville, SC (US)

( * ) Notice: Subject to any disclaimer, the term of this patent is extended or adjusted under 35 U.S.C. 154(b) by 126 days.

(21) Appl. No.: 17/516,852

(22) Filed: Nov. 2, 2021

(65) Prior Publication Data

US 2022/0134363 A1 May 5, 2022

Related U.S. Application Data

(60) Provisional application No. 63/108,669, filed on Nov. 2, 2020.

(51) Int. Cl.
*B05B 1/30* (2006.01)
*B05B 1/34* (2006.01)

(52) U.S. Cl.
CPC ................ *B05B 1/30* (2013.01); *B05B 1/341* (2013.01)

(58) Field of Classification Search
CPC .......... B05B 1/30; B05B 1/341; B65D 83/753
See application file for complete search history.

(56) References Cited

U.S. PATENT DOCUMENTS 3,008,654 A * 11/1961 Abplanalp .......... B29C 45/2628 239/573
4,036,439 A * 7/1977 Green .................... B65D 83/20 239/493
4,125,226 A * 11/1978 Nieuwkamp ......... B05B 1/3436 239/491
4,367,847 A * 1/1983 Bayer ................... B05B 1/3494 239/573
6,732,952 B2 * 5/2004 Kah, Jr. .................... B05B 1/32 239/237
2005/0133542 A1 6/2005 Kolanus
2011/0253752 A1 * 10/2011 Godfrey ................. A61M 11/08 222/566

(Continued)

FOREIGN PATENT DOCUMENTS

CN 104130453 A 11/2014
CN 109942863 A 6/2019

(Continued)

OTHER PUBLICATIONS

International Search Report dated Jan. 26, 2022 from corresponding International Patent Application No. PCT/US2021/057660, 2 pages.

(Continued)

*Primary Examiner* — Qingzhang Zhou
(74) *Attorney, Agent, or Firm* — Ruggiero McAllister & McMahon LLC

(57) ABSTRACT

A one-piece actuator for a valve includes a ramp structure providing a linear sloping passageway communicating with the valve, a chamber that generates a vortex and communicates with the ramp structure, and a nozzle that communicates with the chamber to dispense and mechanically break apart product upon actuation of the valve from an aerosol container. The ramp structure is angled 20 to 60 degrees relative to the chamber.

25 Claims, 22 Drawing Sheets

(56) References Cited

U.S. PATENT DOCUMENTS

| | | | | |
|---|---|---|---|---|
| 2014/0291423 | A1* | 10/2014 | Gopalan ................ | B65D 83/28 239/589.1 |
| 2015/0050425 | A1 | 2/2015 | Hanson et al. | |
| 2016/0101245 | A1 | 4/2016 | Hoekman et al. | |

FOREIGN PATENT DOCUMENTS

| | | | |
|---|---|---|---|
| CN | 112743700 | A | 5/2021 |
| CN | 113388178 | A | 9/2021 |
| WO | 2013/008913 | A1 | 1/2013 |

OTHER PUBLICATIONS

Written Opinion dated Jan. 26, 2022 from corresponding International Patent Application No. PCT/US2021/057660, 5 pages.
Turkish Examination Report dated Sep. 5, 2024 from corresponding Turkish Patent Application No. TR 2023/004366, 5 pages.
European Office Action dated Oct. 29, 2024 from corresponding European Patent Application No. 21887760.3, 13 pages.

* cited by examiner

MECHANICAL BREAKUP ACTUATOR WITH DISRUPTIVE VORTEX CHAMBER

CROSS REFERENCE TO RELATED APPLICATIONS

This application claims the benefit of U.S. Provisional Application Ser. No. 63/108,669, filed Nov. 2, 2020, the entire contents of which are incorporated by reference herein.

BACKGROUND

1. Field of the Disclosure

The present disclosure is directed to a mechanical break up (MBU) valve actuator for a pressurized dispenser. More particularly, the present disclosure relates to such an MBU actuator having a disruptive vortex chamber that atomizes a product during dispensing delivering a Disruptive Breakup spray herein stated DBU.

2. Description of Related Art

Fluid pump actuators of many types have been developed for dispensing product either as a fluid spray, a fluid stream or as both a fluid spray and stream. A fluid spray pattern of some type is generally produced by mechanically breaking up the emitted product prior to discharge through the orifice.

Mechanical breakup is important for generating an even spray. DBU produces this same result replacing the two or more piece construction of a MBU structure.

SUMMARY OF THE DISCLOSURE

The present disclosure provides an actuator for a pressurized product in operative communication with the discharge end of a valve. The actuator disruptively breaks up product and generates a vortex swirl spray pattern.

The present disclosure provides such an actuator that has enhanced mechanical breakup.

The present disclosure also provides such an actuator that has an even spray that is even enhanced form conventional even sprays.

The present disclosure further provides such an actuator that has a disruptive vortex chamber coupled with a positioned outlet therein that assists in DBU of the product.

A one-piece actuator for a valve includes a ramp structure providing a linear sloping passageway communicating with the valve, a chamber structure that generates a vortex and communicates with the ramp structure, and a nozzle that communicates with the chamber to dispense and mechanically break apart product upon actuation of the valve from an aerosol container. The ramp structure is angled 20 to 60 degrees relative to the chamber.

BRIEF DESCRIPTION OF THE FIGURES

The accompanying drawings illustrate aspects of the present disclosure, and together with the general description given above and the detailed description given below, explain the principles of the present disclosure. As shown throughout the drawings, like reference numerals designate like or corresponding parts.

DETAILED DESCRIPTION

Figure 1:
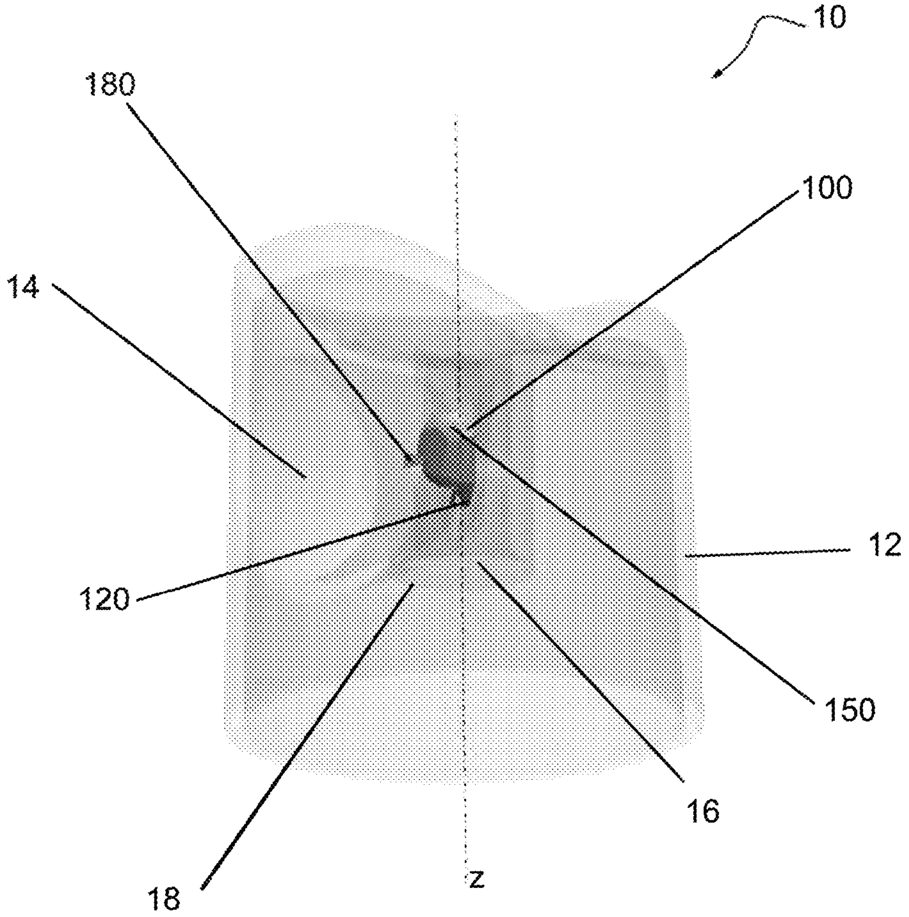
FIG. 1 is a perspective view of a disruptive break up (DBU) valve actuator according to the present disclosure.

Referring to the drawings, and in particular to FIG. 1, a DBU actuator according to the present disclosure is shown and generally referenced by reference numeral 10, hereinafter "actuator 10". Actuator 10 has a unique disruptive vortex chamber that atomizes a product during dispensing.

Actuator 10 is mounted on a valve stem of a dispenser or a container for a pressurize product. Reciprocal movement of actuator 10 and an operatively connected valve stem along a central axis, shown as z axis in FIG. 1, causes actuation of the valve and thus product to be dispensed from the container.

Referring to FIG. 1, actuator 10 has an external wall 12 that is disposed about a central vertical axis z. Wall 12 is cylindrical as shown. Wall 12 has an opening 14 oriented virtually perpendicular, and preferably perpendicular, to axis z through which product is dispensed from the container. A tubular channel 16 is disposed along axis z. Channel 16 communicates with opening 14 of wall 12 through a structure 100. Tubular channel 16 has a socket 18 at a lower end thereof for operative cooperation with a valve stem (not shown).

Figure 2:
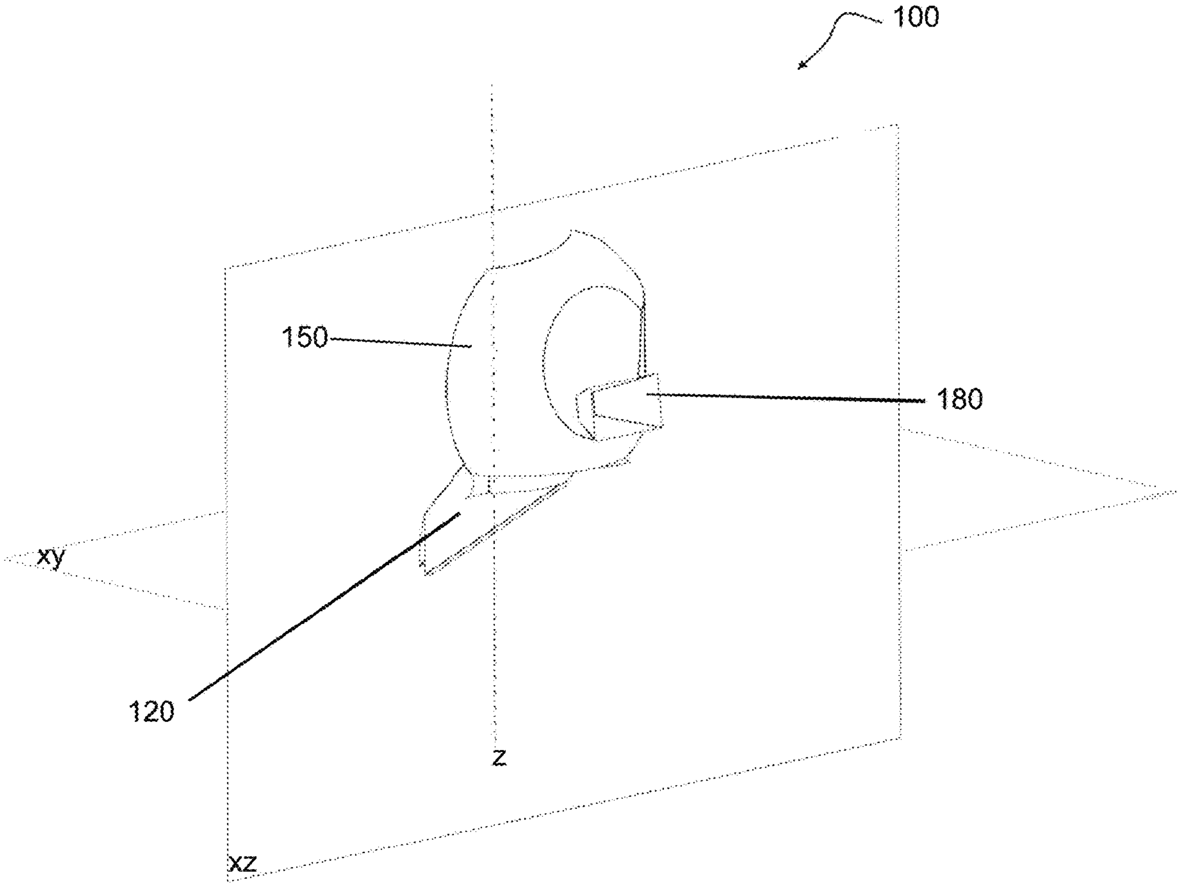
FIG. 2 is a front perspective view of a disruptive vortex chamber of the DBU valve actuator of FIG. 1.

Referring to FIG. 2, an internal structure 100 of actuator 10 is shown that includes a ramp 120, a chamber 150 and a nozzle 180.

Referring to FIGS. 1 and 2, internal structure 100 is disposed in tubular channel 16 so that upon actuation, product flows from the valve up into tubular channel 16, up ramp 120, through chamber 150, through nozzle 180, and finally through opening 14.

Figure 3:
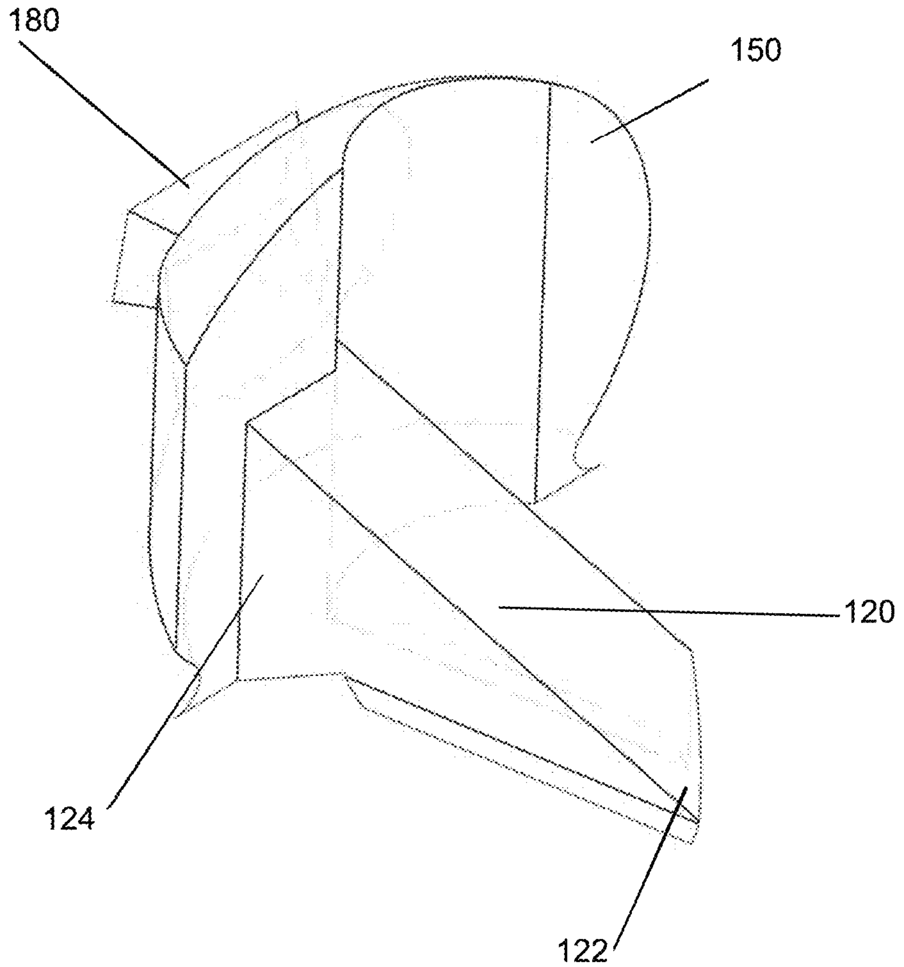
FIG. 3 is a rear perspective view of the disruptive vortex chamber of FIG. 2.

Referring to FIGS. 2 and 3, ramp 120 is a linear sloping passageway that has an entrance section 122 and an exit section 124, relative to product flow from the container.

Entrance section 122 has a larger cross-sectional area than exit section 124. Thus, as product flow transitions from entrance section 122 to exit section 124, velocity increases. In examples, the cross-sectional areas between entrance section 122 and exit section 124 are in a ratio of 1:1.18 or less.

Ramp 120 is shown to have a tubular shape. However, ramp 120 can, in other embodiments, have a different shape.

Figure 4:
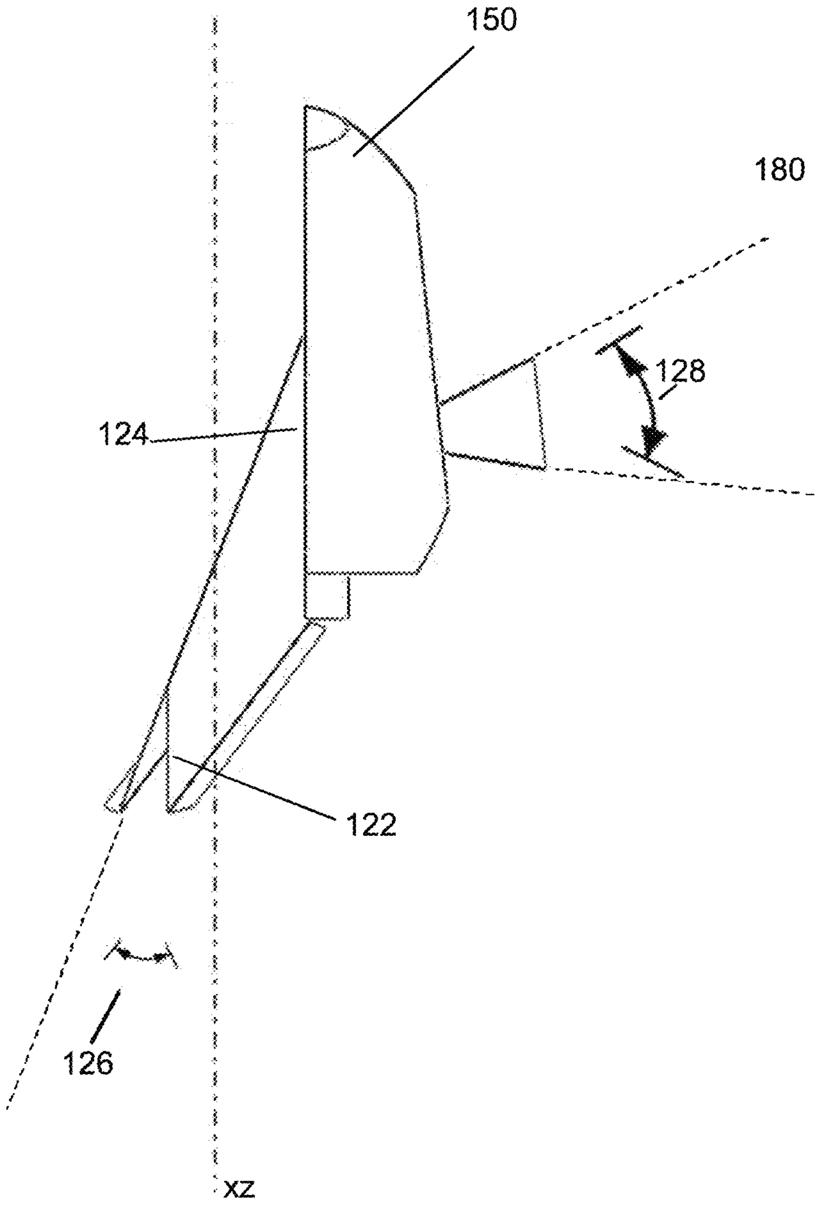
FIG. 4 is a side view of the disruptive vortex chamber of FIG. 2.

Referring to FIG. 4, ramp 120 rises at an angle 126 relative to an x-y plane. Ramp 120 is disposed at an angle 128 relative to an x-z plane.

Angle 126 can be from 15° to 40°, more preferably from 20° to 30°, and most preferably from 25° to 30°. Angle 128 can be from 5° to 35°, more preferably from 10° to 25°, and most preferably from 15° to 20°.

Advantageously, ramp 120 accelerates the velocity of the product as the product flows into chamber 150 due to vortex flow. While not being limited, it is believed that angles 126 and 128 initiate the vortex flow.

Figure 5:
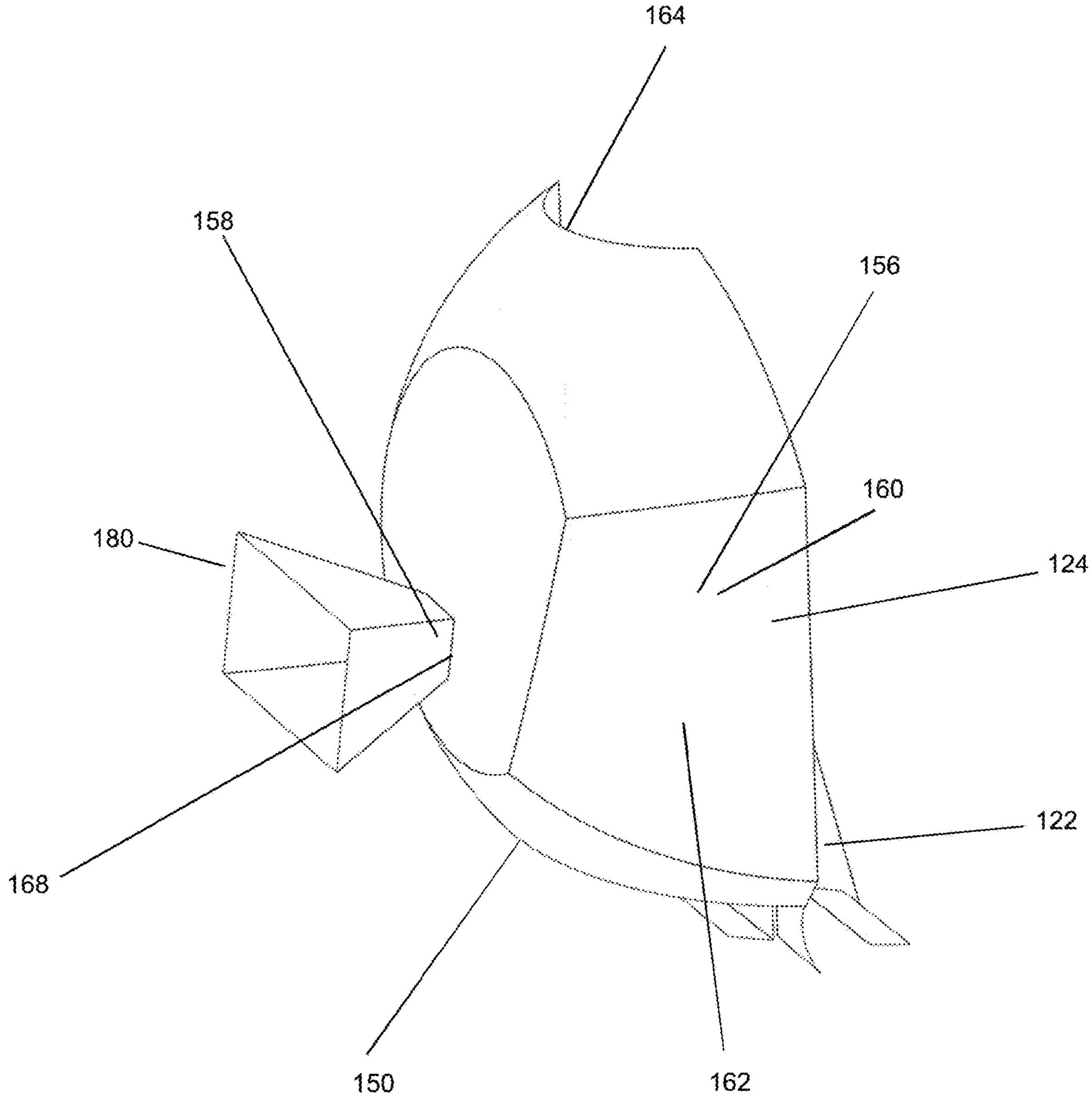
FIG. 5 is another perspective view of the disruptive vortex chamber of FIG. 2.
Figure 6:
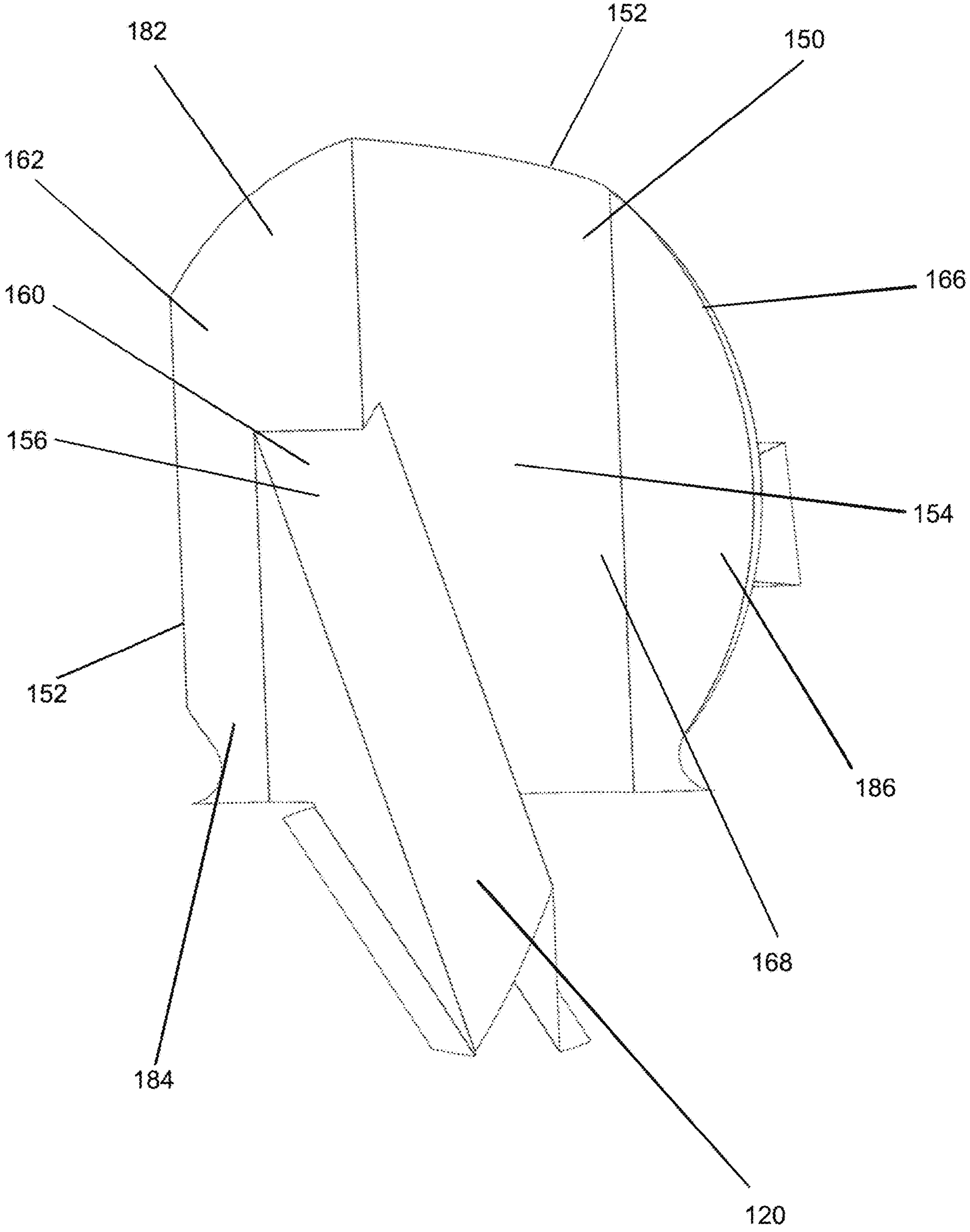
FIG. 6 is another perspective view of the disruptive vortex chamber of FIG. 2.

Referring to FIGS. 5 and 6, chamber 150 has a wall structure 152 defining an inner volume 154, an entrance 156 connected to exit section 124 of ramp 120, and an exit 158 connected to nozzle 180.

Chamber 150 is a disruptive vortex chamber. That is, chamber 150 has certain internal geometries that combine to generate a disruptive vortex therein that assists in DBU of product. These internal geometries include an opening 160, a planar surface 162, a curvilinear surface 164, a curved surface 166 and an exit orifice 168.

Ramp 120 directs product flow through opening 160 to strike planar surface 162. Ramp 120 has a width greater than 0.5 mm. Opening 160 is sized to not restrict flow.

Figure 7:
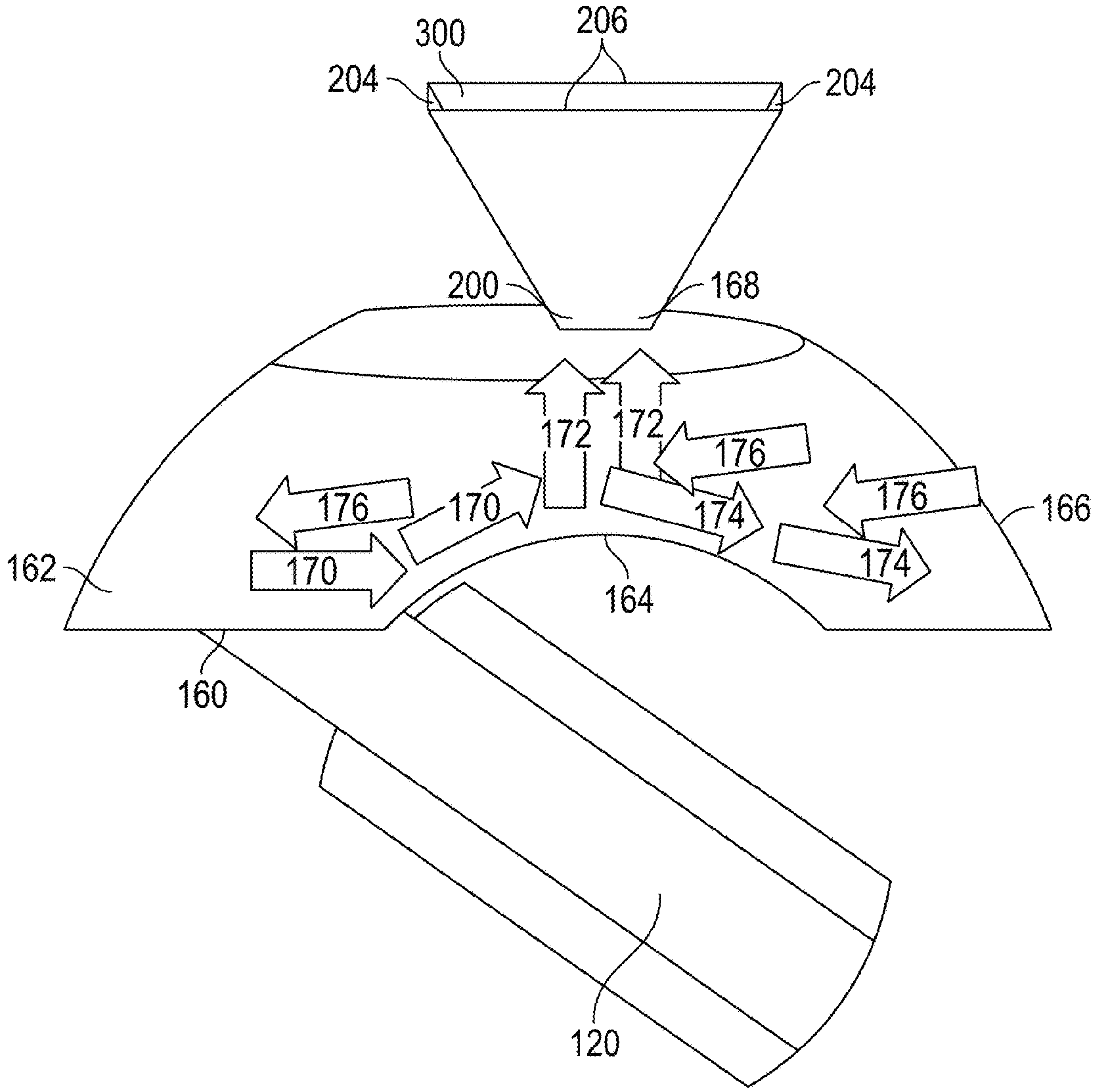
FIG. 7 is a top view of the disruptive vortex chamber of FIG. 2.

Referring to FIG. 7, planar surface 162 deflects product flow toward and around curvilinear surface 164, as shown by arrow 170. Curvilinear surface 164 directs a portion of product forward in chamber 150, as shown by arrow 172, while a portion of product strikes curved surface 166, as shown by arrow 174.

Curved surface 166 deflects product flow back to planar surface 162, as shown by arrow 176. This product flow collides with product represented by arrows 170 and 172. Thus, product flows in a swirl pattern toward a sharp exit orifice 168.

Advantageously, curvilinear surface 164 creates a dual flow chamber that facilitates vortex generation and DBU. This results in eddies.

The structure of chamber 150 creates low P zones 182, 184, 186 to facilitate generating eddy currents. An eddy is a violent swirling motion caused by a position and direction of turbulent flow.

Figure 8:
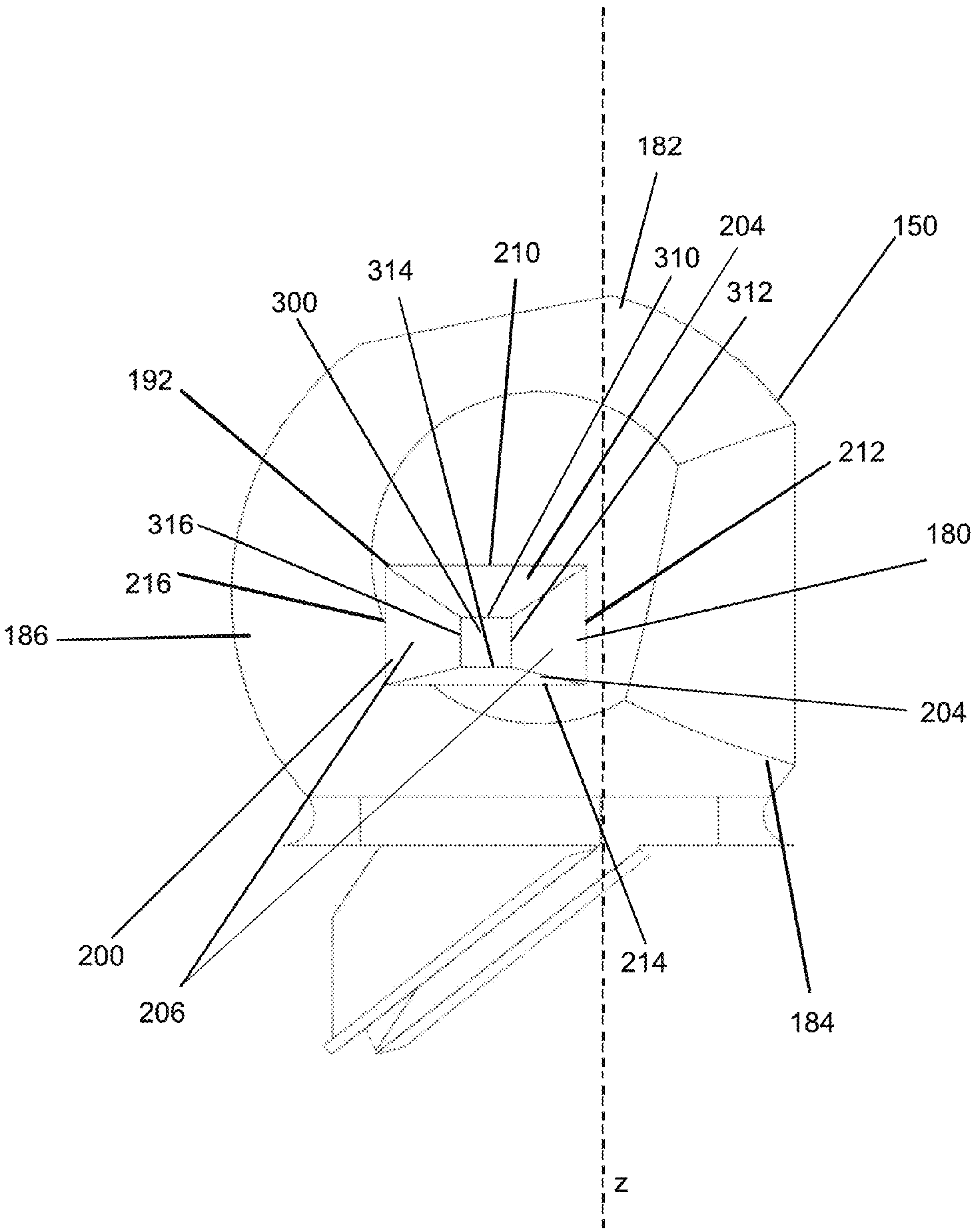
FIG. 8 is a front view of the disruptive vortex chamber of FIG. 2.

Products exits chamber 150 via nozzle 180 shown in FIG. 8. Nozzle 180 has a rectangular wall structure 192 and two offset planar openings 200 and 300. Opening 200 is larger than opening 300 as can be seen in both FIGS. 7 and 8.

As will be discussed later, nozzle 180 can alternatively have a round or oval structure. It has been found by the present disclosure that certain products or formulations achieve a completer and more thorough mechanical breakup with a round or oval structure, while other certain products or formulations achieve a completer and more thorough mechanical breakup with a rectangular structure. In particular, the viscosity of the product or formulation and the shape will affect mechanical breakup. For example, olive oil having a high viscosity will achieve greater mechanical breakup with a square or rectangular nozzle.

Nozzle 180 can have an orifice area of 0.2 to 0.45 mm.

Opening 200 and opening 300 have offset edges 210, 212, 214, 216, and 310, 312, 314, 316, respectively.

Between opening 200 and 300, an inner volume of nozzle 180 includes walls 204 and 206.

In some embodiments, walls 204 are parallel, while walls 206 are at an angle. The angle of walls 206 are from 5° to 50°, preferably from 25° to 40°, and more preferably from 30° to 35°.

In other embodiments, walls 204 are at an angle from 5° to 35°, preferably from 10° to 25°, and more preferably from 15° to 20°. While in these embodiments, walls 206 are at an angle from 5° to 50°, preferably from 25° to 40°, and more preferably from 30° to 35°.

Opening 200 and opening 300 are offset by a distance of at least 0.15 mm to 0.40 mm, preferably 0.2 mm to 0.35 mm, and more preferably from 0.25 mm to 0.3 mm.

Unlike traditional actuators having a centrally disposed nozzle, nozzle 180 is in parallel offset to an axis normal to axis z.

Figure 9:
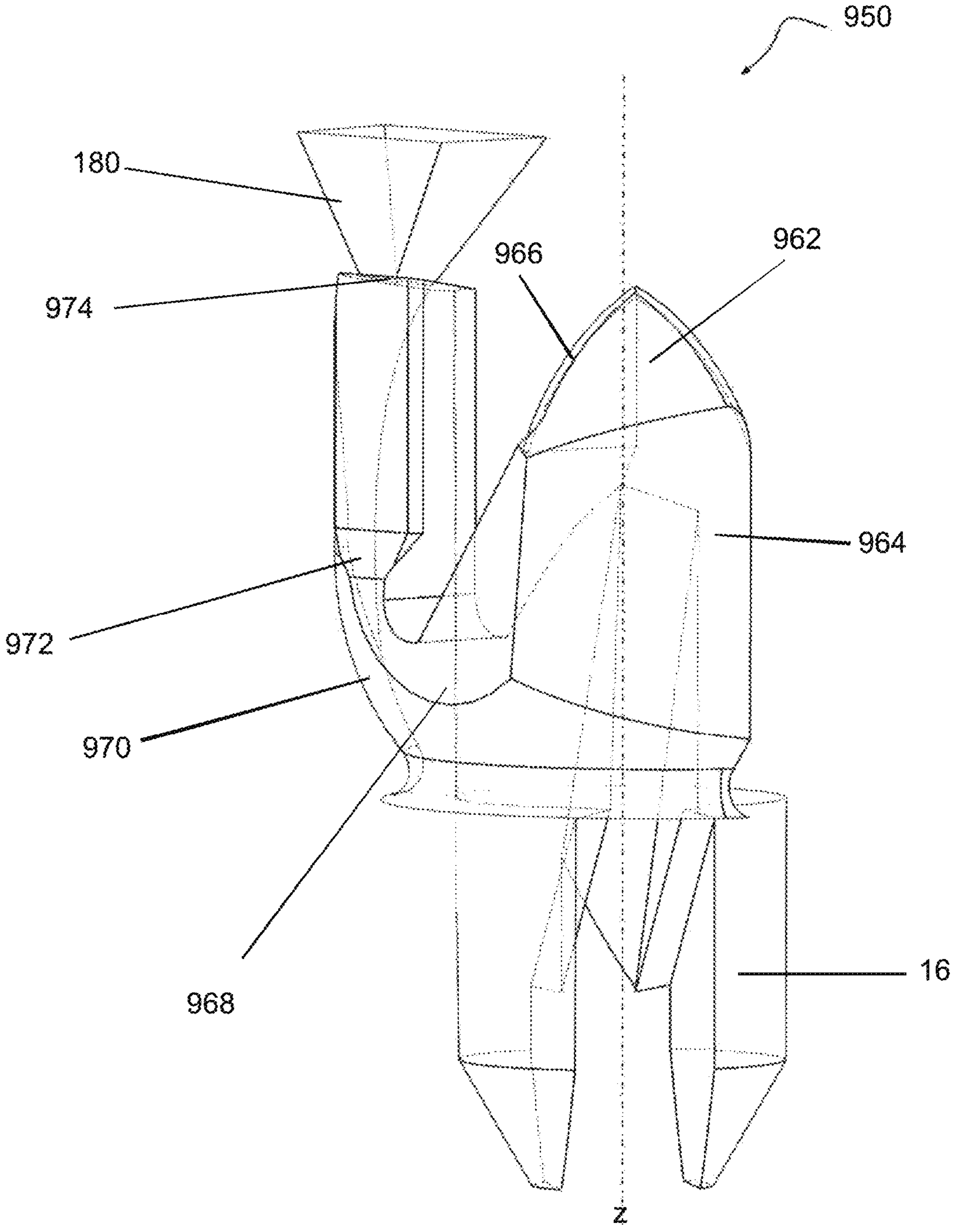
FIG. 9 is a perspective view of a disruptive vortex chamber for a vertical valve actuator.

Referring to FIG. 9, a vertical disruptive vortex chamber, chamber 950 is shown. Similar to chamber 150, chamber 950 has certain internal geometries that combine to generate a disruptive vortex therein that assists in DBU of product.

Figure 10:
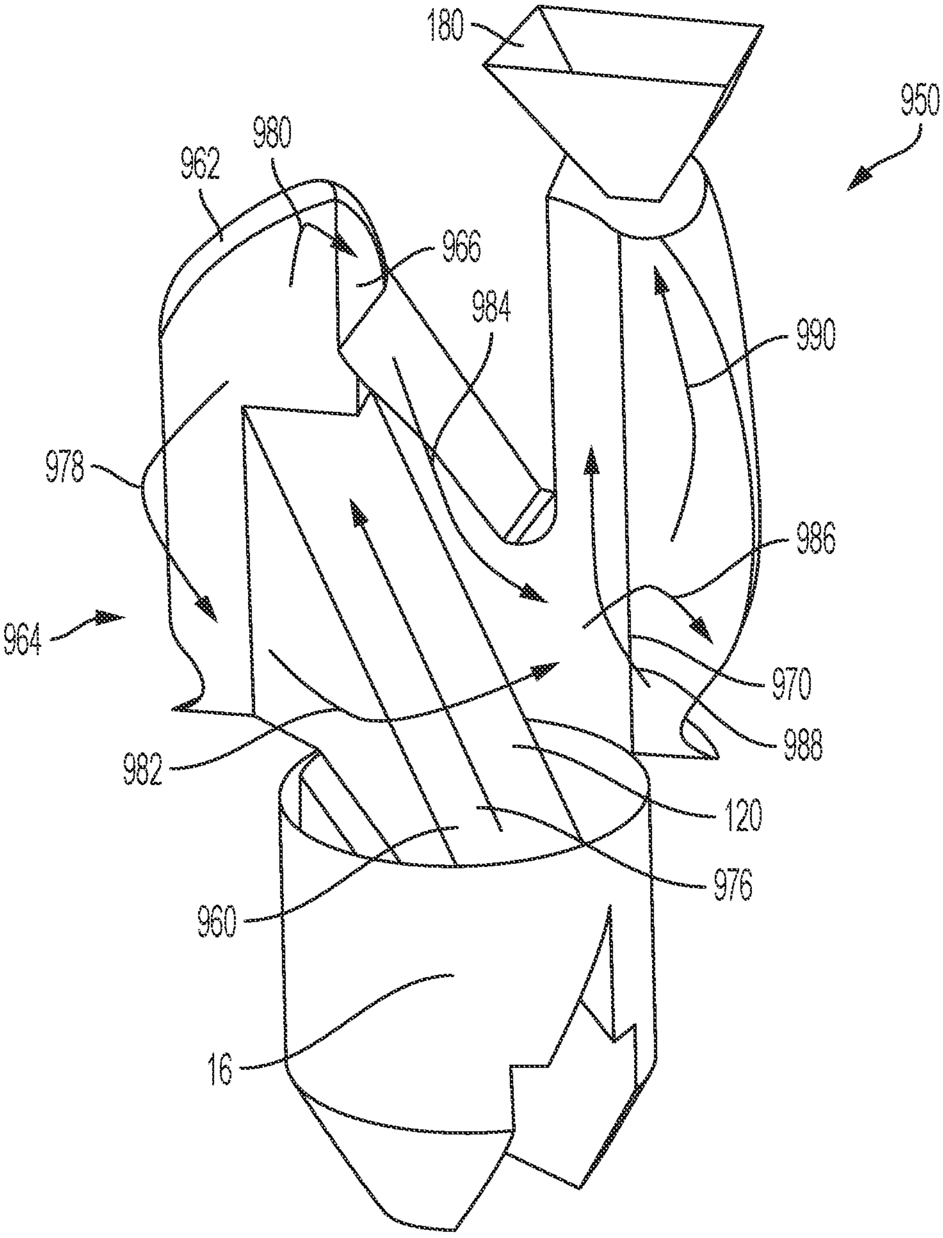
FIG. 10 is another perspective view of the disruptive vortex chamber of FIG. 9.

Referring also FIG. 10, these internal geometries include an opening 960, a curvilinear surface 962, a curvilinear surface 964, a planer surface 966, a planer surface 968, a curvilinear surface 970, a planer surface 972 and an exit orifice 974.

Figure 11:
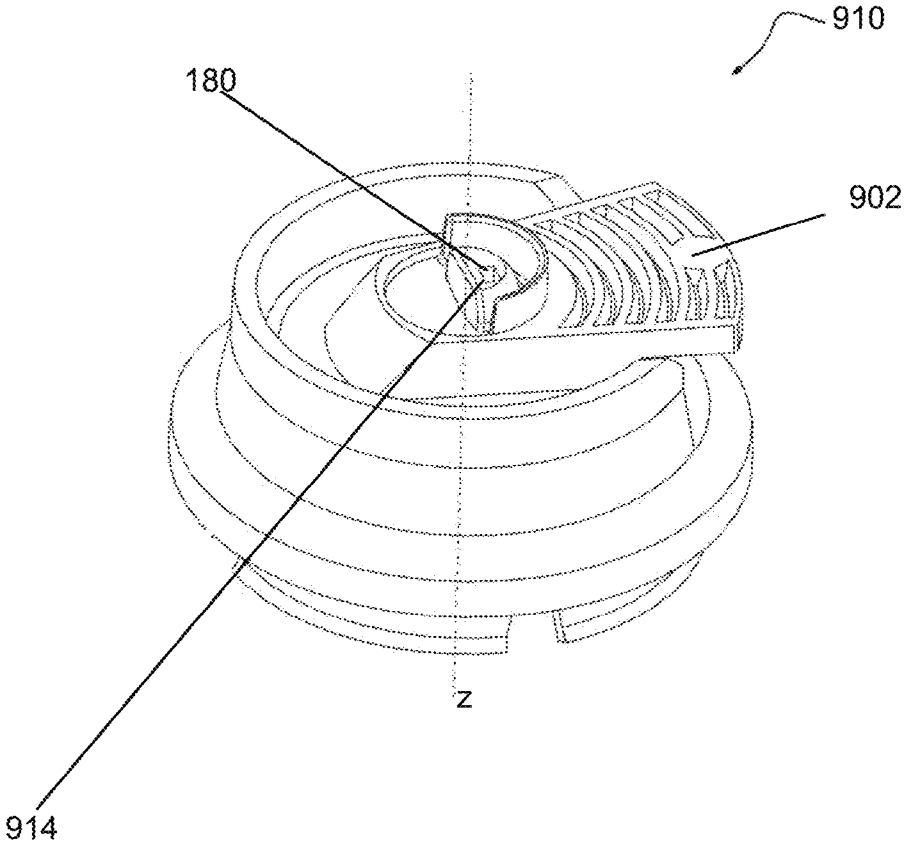
FIG. 11 is a vertical valve actuator.

Chamber 950 cooperates with an actuator like actuator 10, namely actuator 910, shown in FIG. 11. However, actuator 910 has a vertical opening 914.

Referring back to FIGS. 9 and 10, as indicated by arrow 976, ramp 120 directs product flow through an opening 960 to strike a curvilinear surface 962. Opening 960 is sized to not restrict flow. Here, ramp 120 is shown connected to tubular channel 16.

As shown by arrow 978, curvilinear surface 962 deflects a portion of product flow towards curvilinear surface 964. As shown by arrow 980 curvilinear surface 962 deflects a portion of product flow towards planar surface 966.

Curvilinear surface 964 deflects product flow toward planer surface 968 and curvilinear surface 970, as shown by arrow 982. Planar surface 966 also deflects product flow toward planar surface 968 and curvilinear surface 970, as shown by arrow 984.

The product flows indicated by arrows 982 and 984 collide and deflect off of curvilinear surface 970, as represented by arrow 986. This product flow collision and further deflection facilitates vortex generation and DBU. Thus, product flows in a swirl pattern toward a sharp exit orifice 974, as shown by arrows 988 and 990.

Products exits chamber 950 via nozzle 180. As can be seen, configured with chamber 950, nozzle 180 is in parallel offset to an axis parallel to axis z.

Referring back to FIG. 11, actuator 910 includes a finger pad 902 that causes nozzle 180 to tilt off vertical when pressed down. Advantageously, nozzle 180 can be oriented relative to chamber 950 and opening 914 so that the spray pattern is directed away from the user or entirely vertical while in operative use. Such orientation avoids the very common problem of a user getting wet before learning to compensate by tilting the container.

Actuator 910 is a front hinge actuator. A rear hinge actuator would have a reversed orientation.

Figure 12:
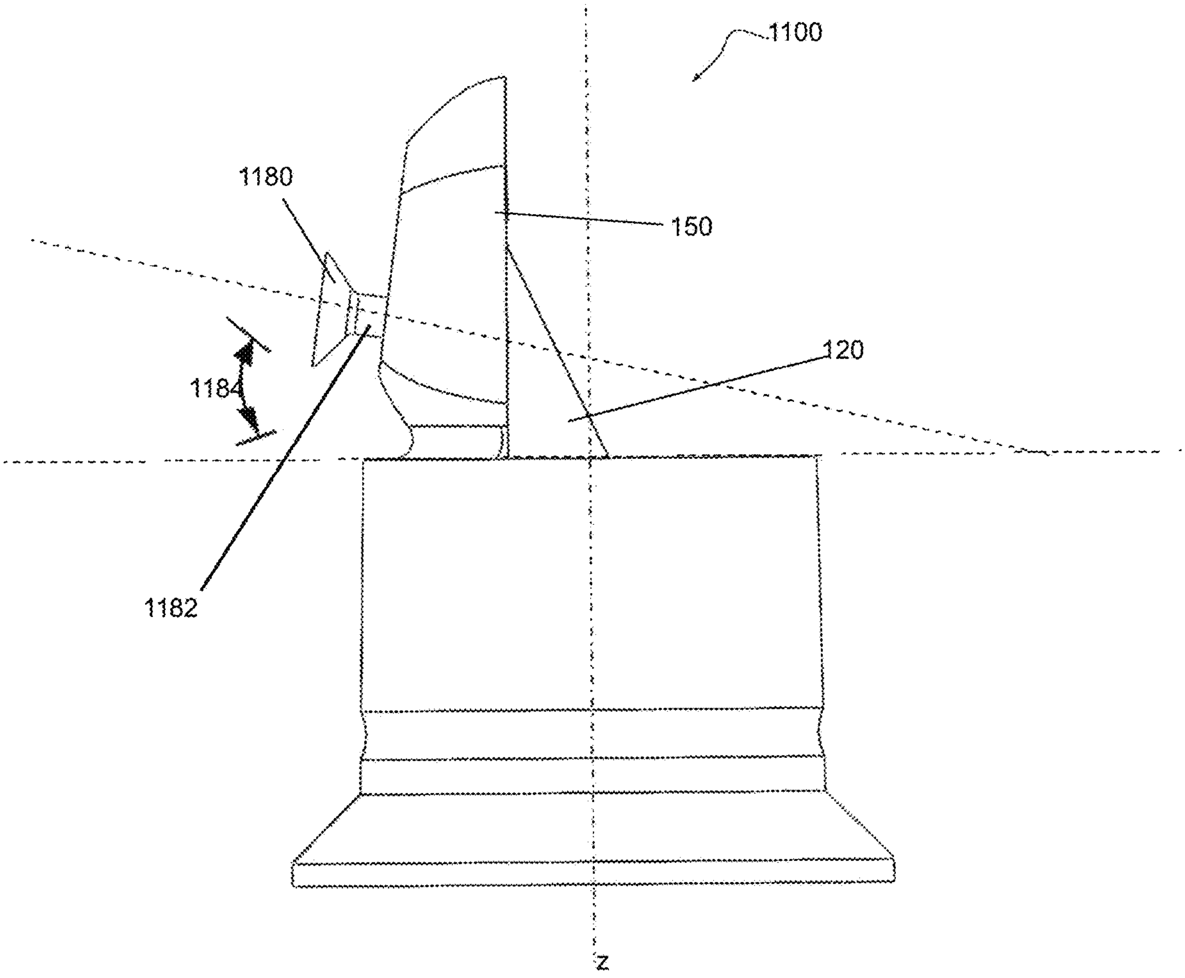
FIG. 12 is a DBU valve actuator having a round nozzle.

Referring to FIG. 12, structure 1100 is shown. Structure 1100 is the same as structure 100 except as noted below.

Structure 1100 has a nozzle 1180 that is round or ovular. Nozzle 1180 is connected to chamber 150 by a conduit 1182. Conduit 1182 can be disposed normal or perpendicular to a z-axis. Alternatively, as shown, conduit 1182 can be angled from angle 1184 that is greater than about 0° to 30° relative to perpendicular.

Figure 13:
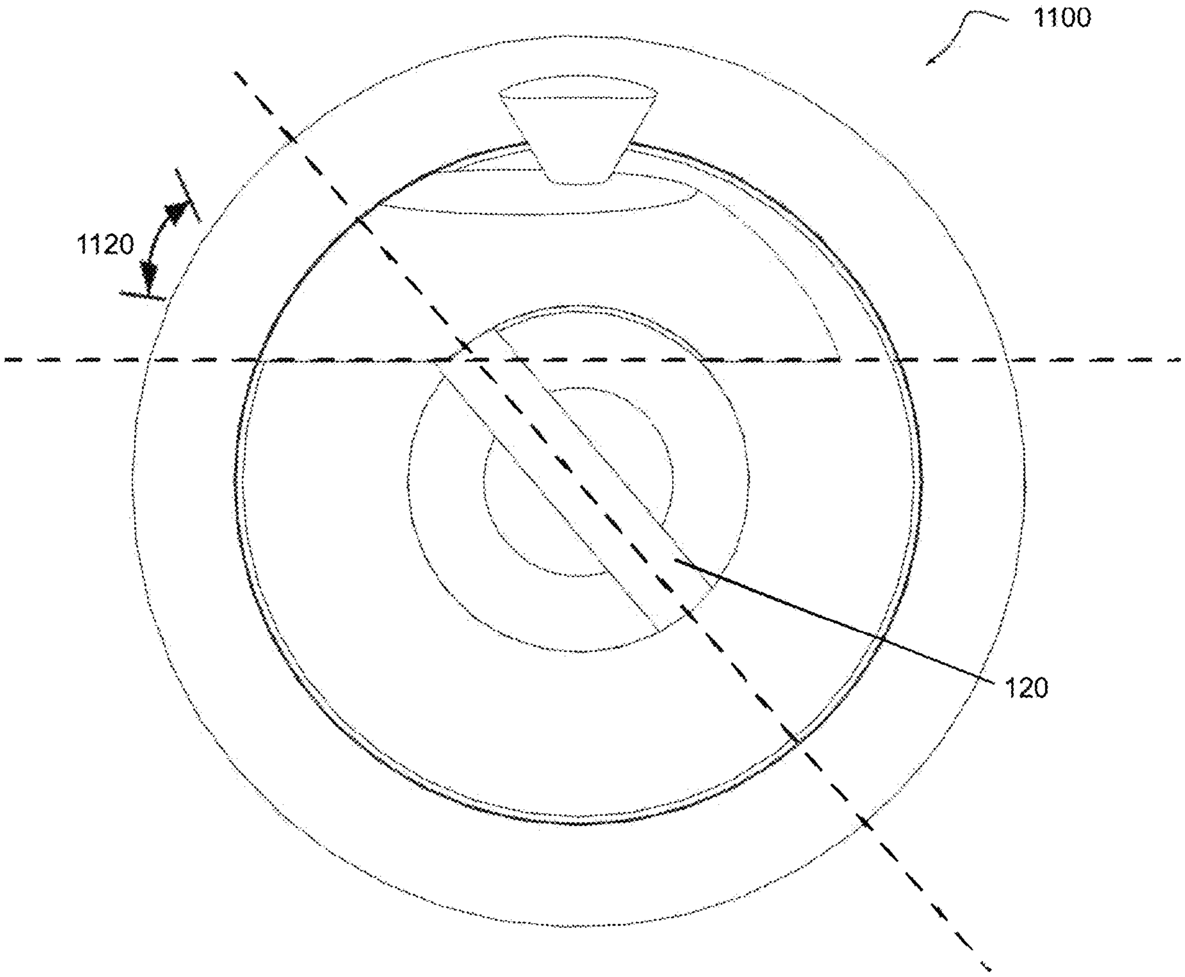
FIG. 13 is a top view a DBU showing ramp angles.

Referring to FIG. 13, structure 1100 is shown again. Ramp 120 is disposed at an angle 1120. Angle 1120 can be from 20° to 60°, preferably from 28° to 50°, more preferably from 28° to 40°, and most preferably from 28° to 34°, including subranges therebetween. An angle of about 30° has been found to be particularly effective.

Figure 14:
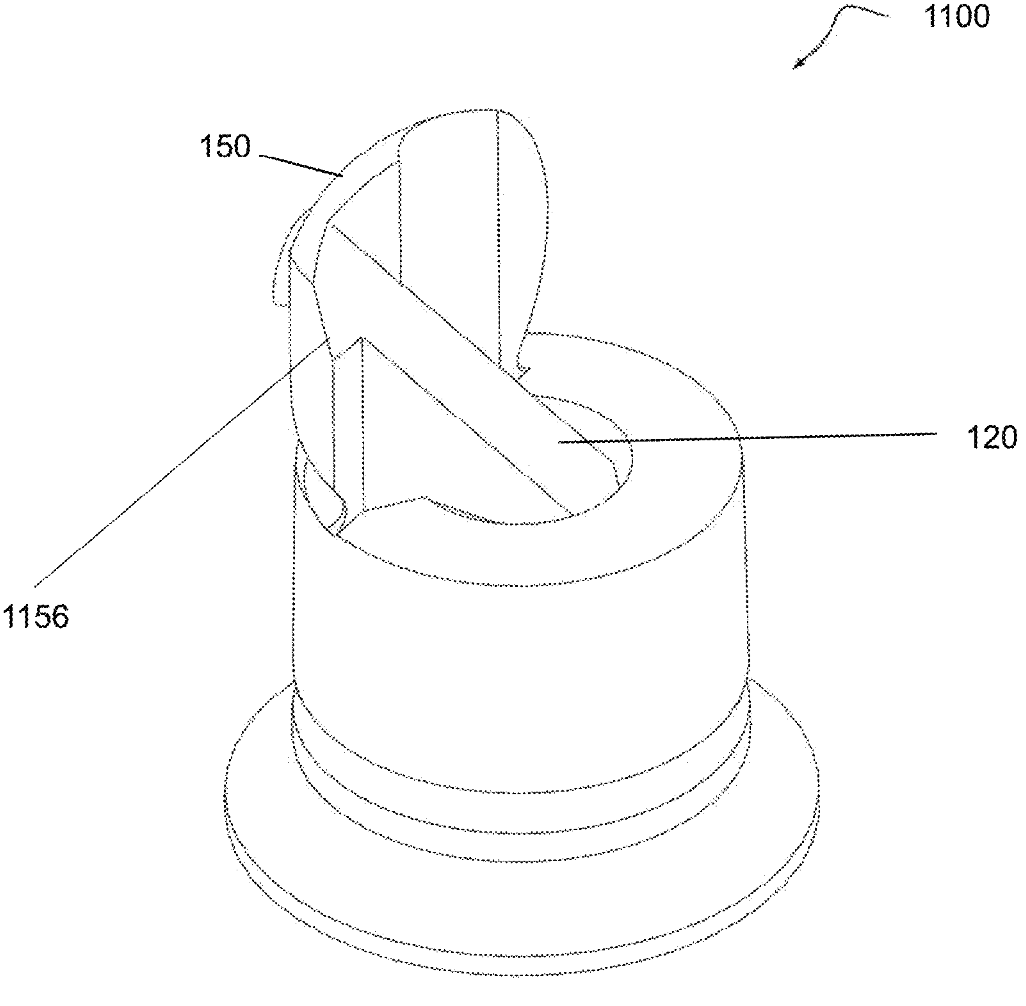
FIG. 14 is a perspective view a DBU valve actuator having an extended ramp.
Figure 15:
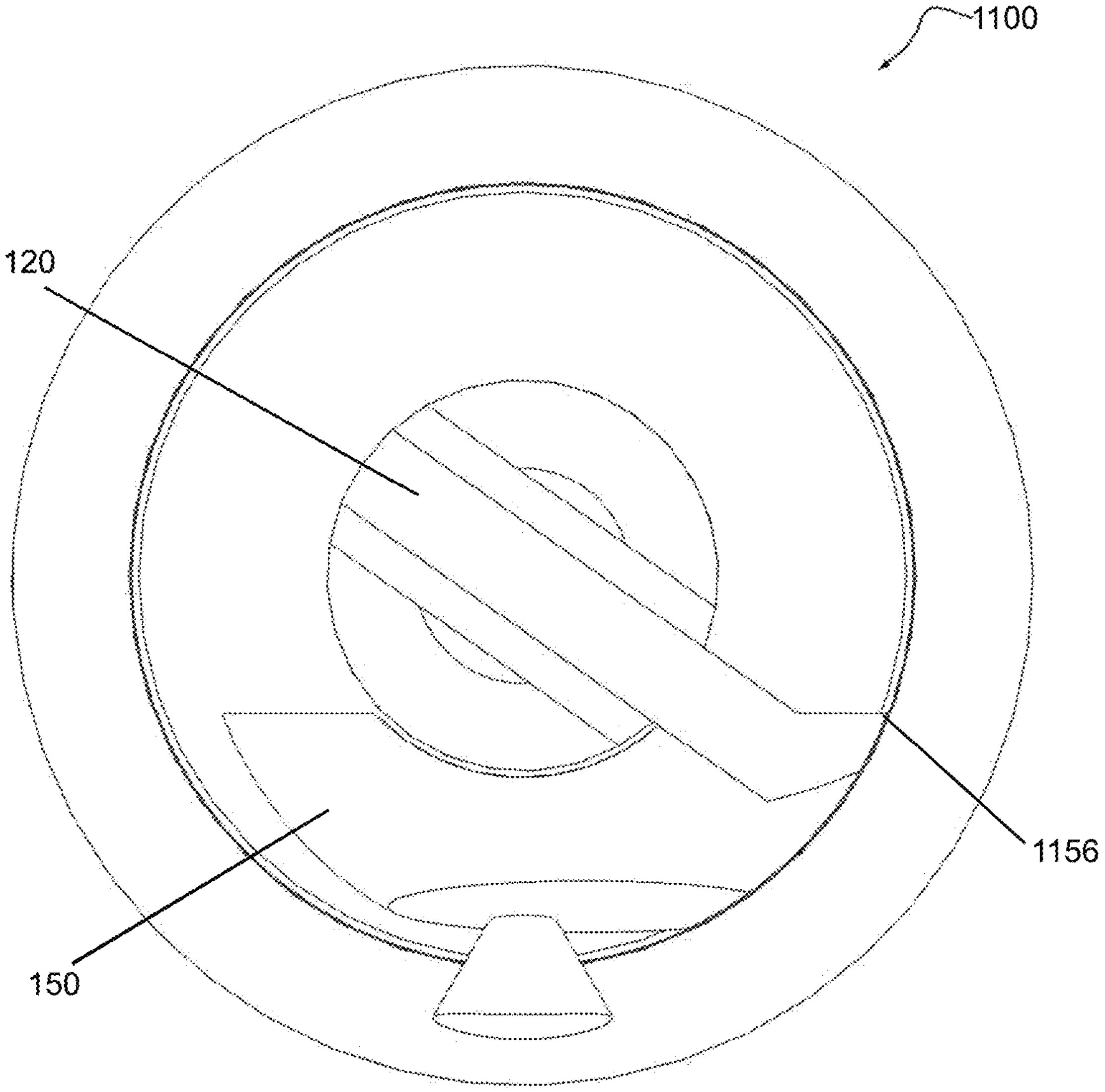
FIG. 15 is a top view a DBU valve actuator having an extended ramp.

Referring to FIGS. 14 and 15, a top and perspective view of structure 1100 are shown. Here, ramp 120 extends to an outermost edge 1156 of chamber 150.

Figure 16:
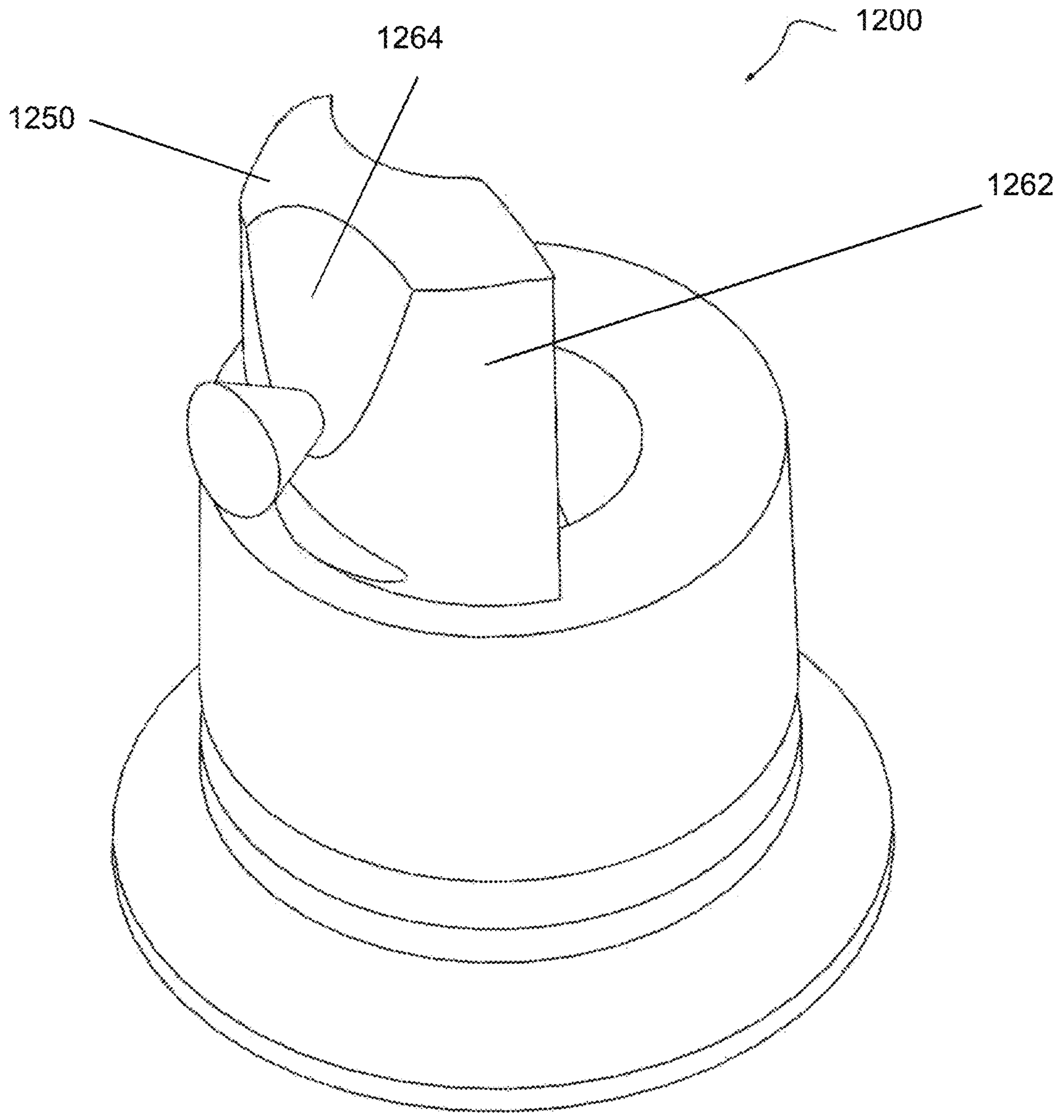
FIG. 16 is a perspective view a DBU valve actuator having a small chamber.
Figure 17:
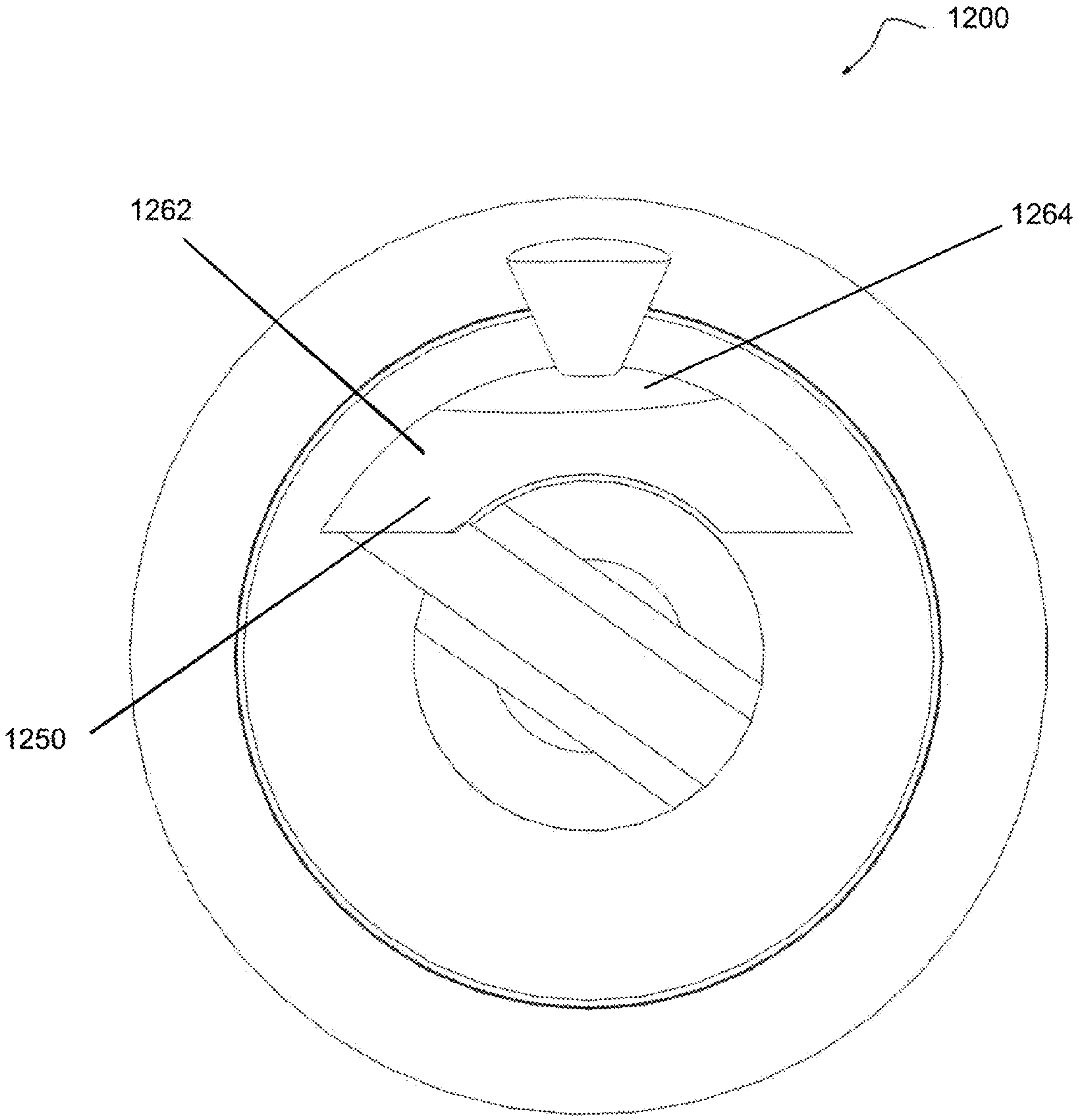
FIG. 17 is a top view a DBU valve actuator having a small chamber.

Referring to FIGS. 16 and 17, a top and perspective view of a structure 1200 is shown, respectively. Structure 1200 is the same as structure 100 except as noted below.

Structure 1200 includes a chamber 1250 that has a reduced size compared to chamber 150. Specifically, chamber 1250 has a curvilinear surface 1262 and planar surface 1264 that are reduced in size compared to curvilinear surface 162 and planar surface 164 as shown in FIG. 5. Stated another way chamber 150 in FIG. 13 has a diameter that is about the same size as a diameter of the valve, whereas chamber 1250 has a diameter less than a diameter of the valve.

Figure 18:
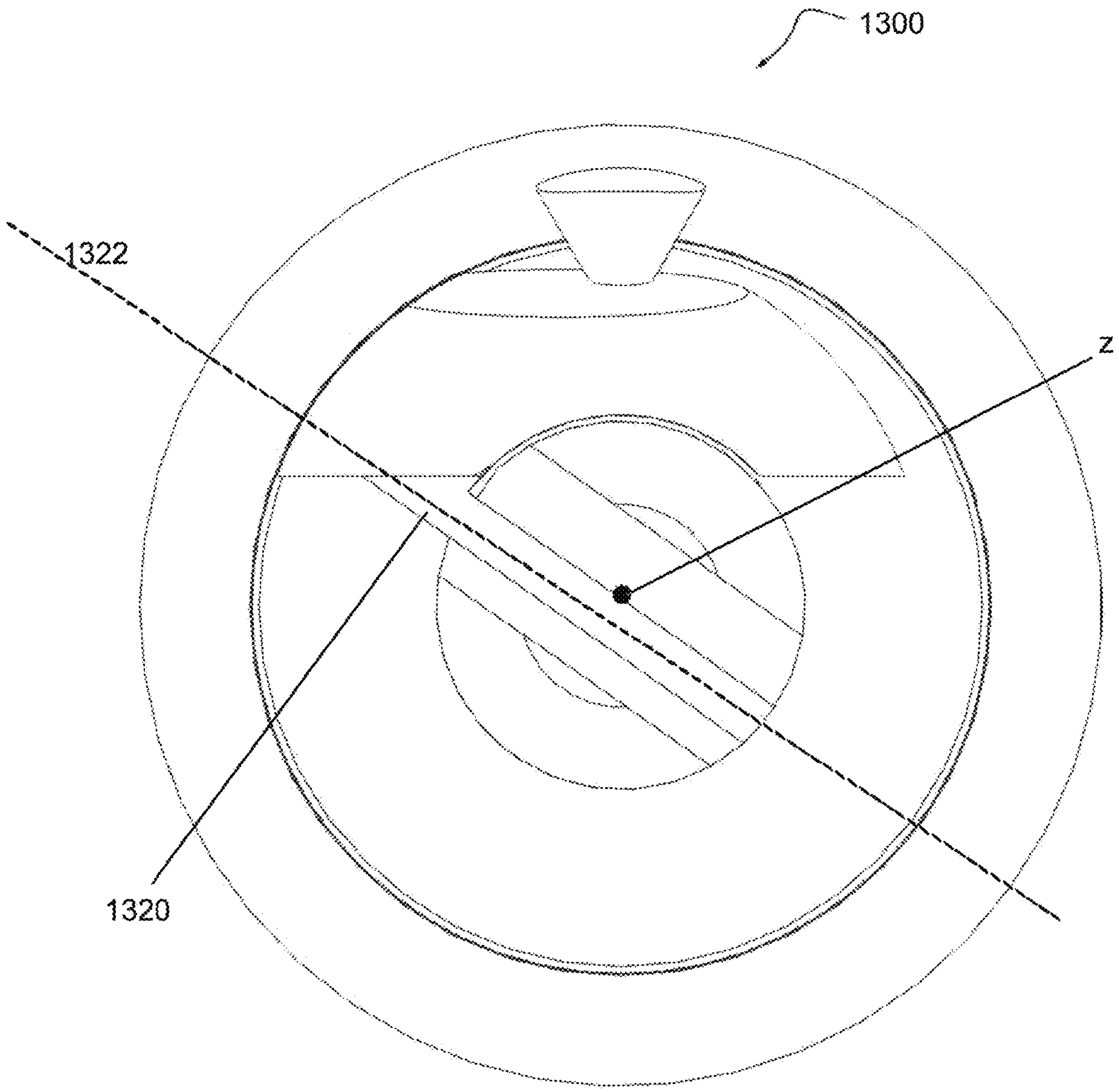
FIG. 18 is a top view a DBU valve actuator having a centerline offset ramp.

Referring to FIG. 18, a top view of structure 1300 is shown. Structure 1300 is the same as structure 100 except as noted below. Structure 1300 includes a ramp 1320 instead of ramp 120. Unlike ramp 120, ramp 1320 has a centerline 1322 that is offset from and does not intersect axis z.

Figure 19:
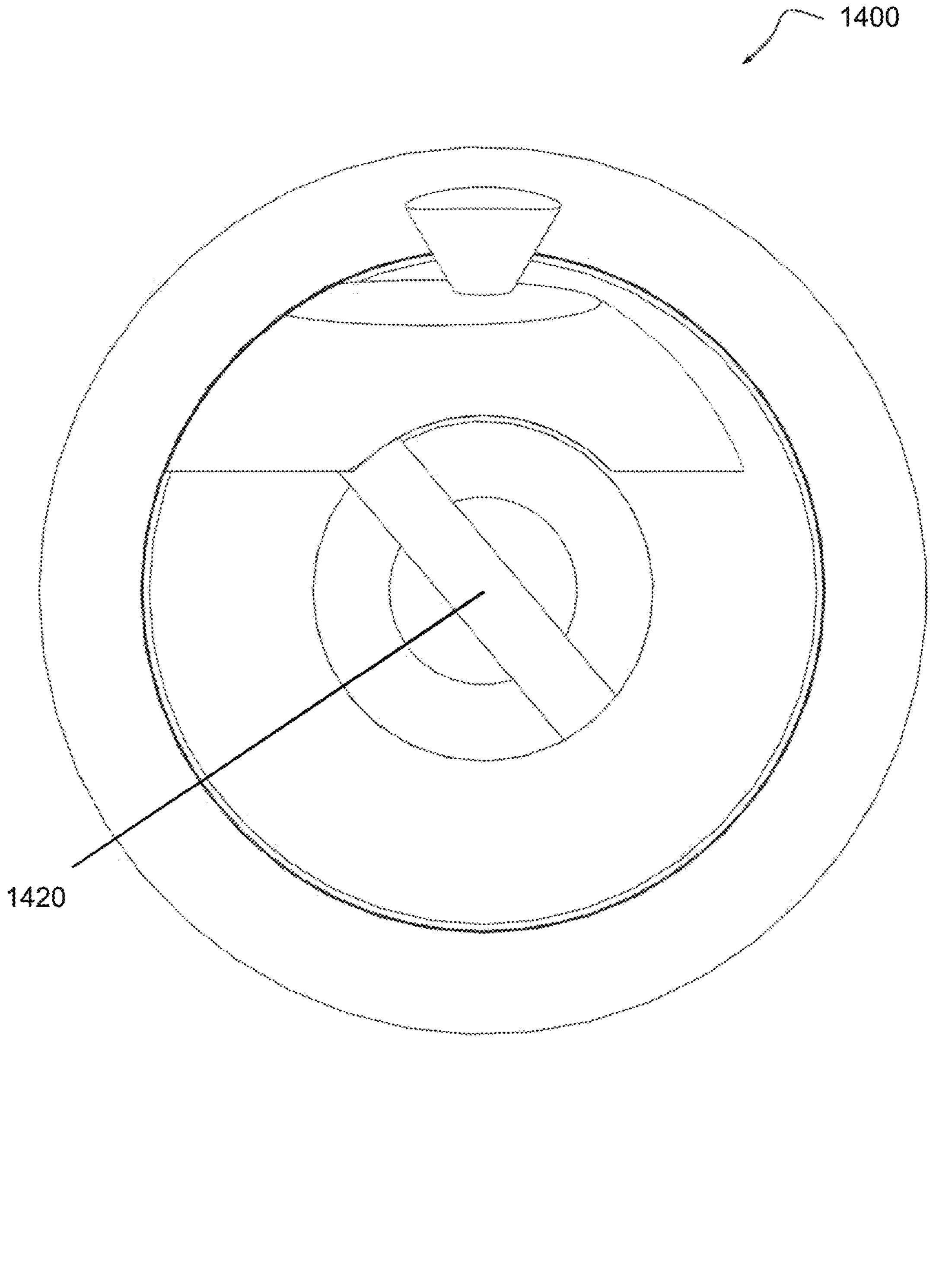
FIG. 19 is a top view a DBU valve actuator having a thinned ramp.

Referring to FIG. 19, a top view of structure 1400 is shown. Structure 1400 is the same as structure 100 except as noted below. Structure 1400 includes a ramp 1420 instead of ramp 120. Ramp 1420 has a width from about 0.15 mm to 0.5 mm.

Figure 20:
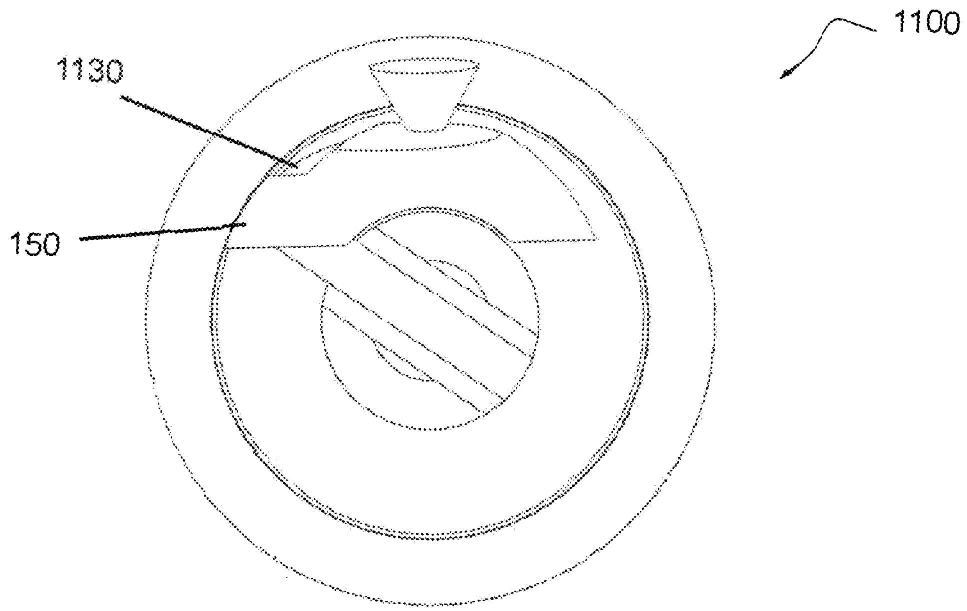
FIG. 20 is a perspective view of a DBU valve actuator having a diverter.
Figure 21:
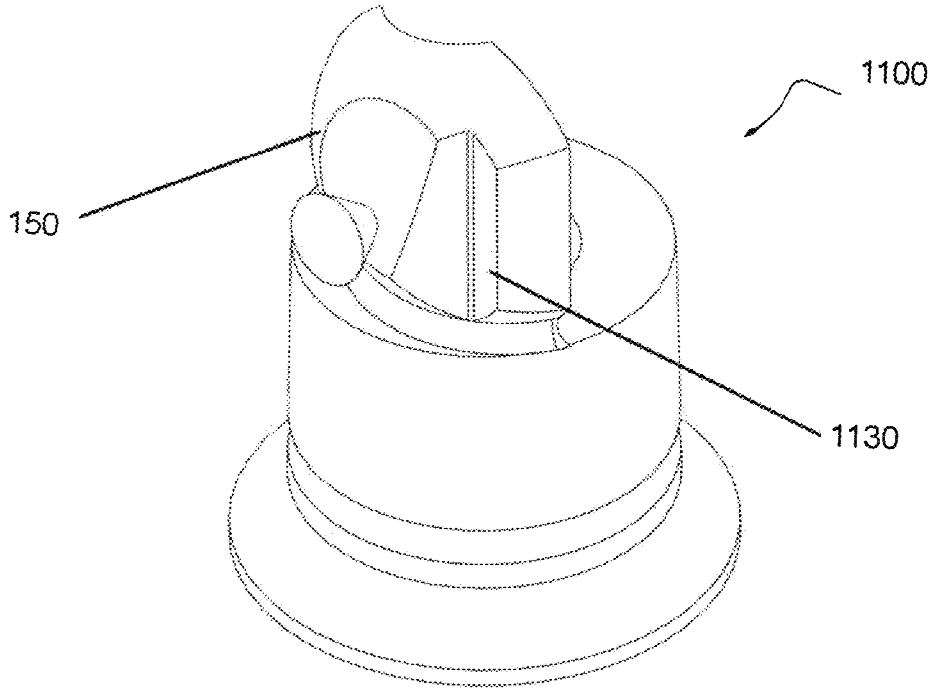
FIG. 21 is a top view a DBU valve actuator having a diverter.

Referring to FIGS. 20 and 21, structure 1100 is shown with chamber 150 having a diverter 1130. Diverter 1130 is structure that disrupts and redirects product flow in two or more directions. Advantageously, diverter 1130 further enhances mechanical breakup of product by causing additional colliding flow paths.

Figure 22:
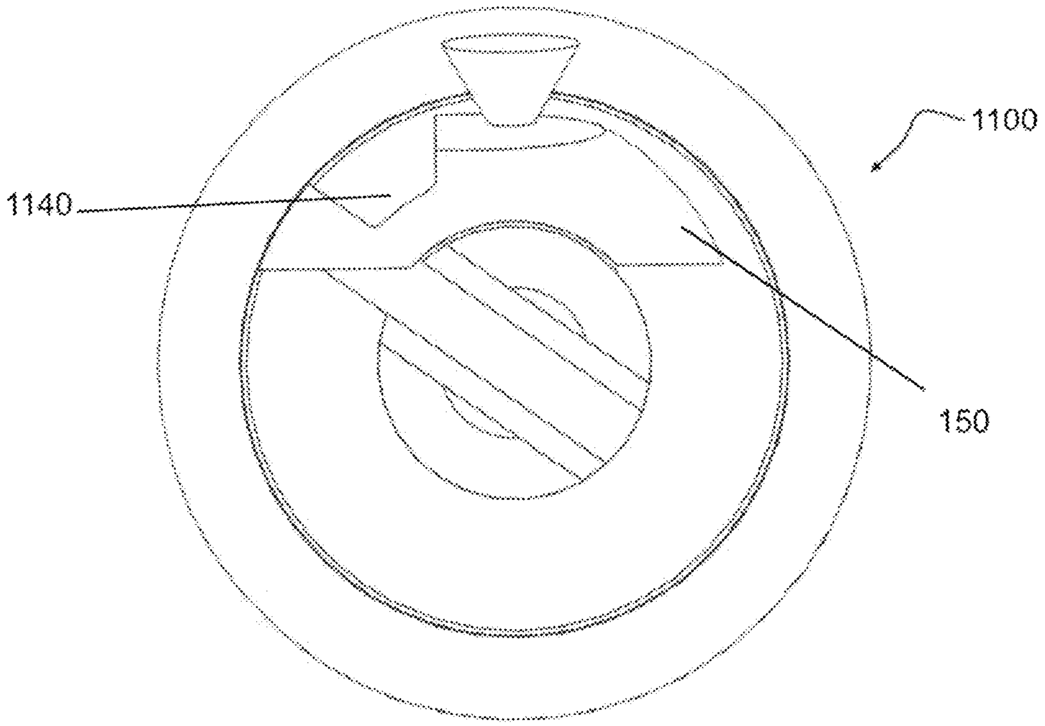
FIG. 22 is a perspective view of a DBU valve actuator having a flow channel.
Figure 23:
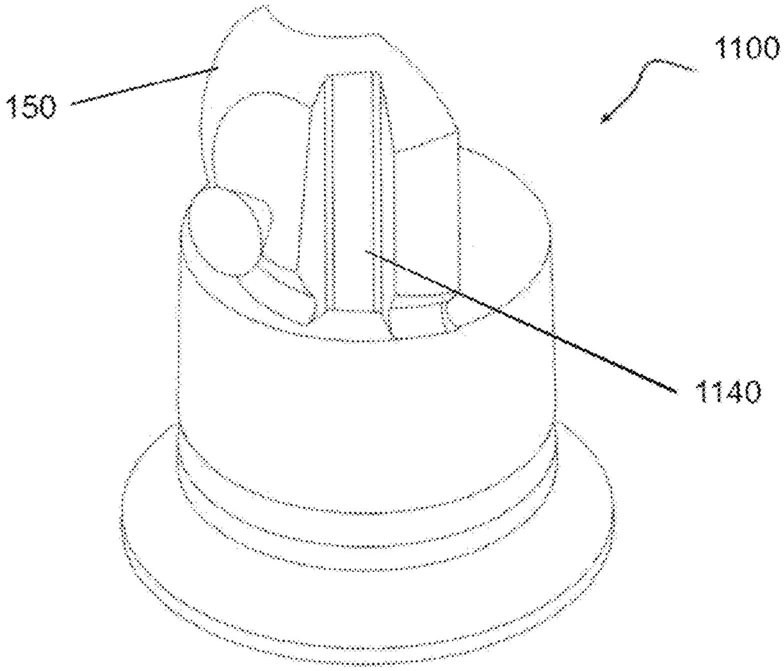
FIG. 23 is a top view a DBU valve actuator having a flow channel.

Referring to FIGS. 22 and 23, structure 1100 is shown with chamber 150 having a flow channel 1140. Flow channel 1140 is a structure that creates an additional flow path in chamber 150. Advantageously, flow channel 1140 further enhances mechanical breakup of product by this additional flow path.

Figure 24:
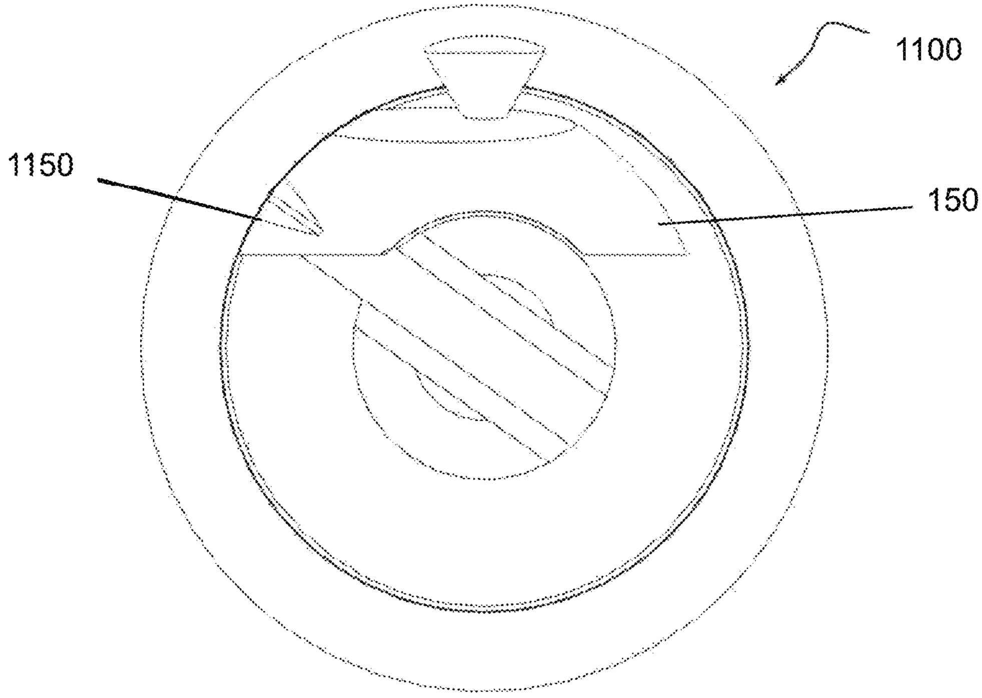
FIG. 24 is a perspective view of a DBU valve actuator having an interrupter.
Figure 25:
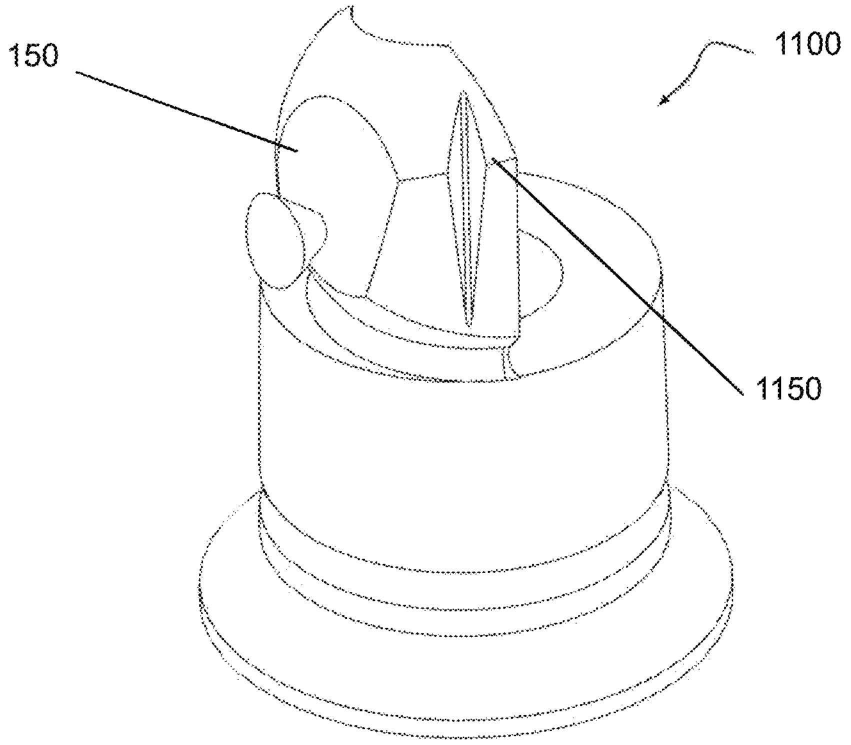
FIG. 25 is a top view a DBU valve actuator having an interrupter.

Referring to FIGS. 24 and 25, structure 1100 is shown with chamber 150 having an Interrupter 1150. Interrupter 1150 is a structure that restricts or obstructs product flow thereby forcing additional circulation and further mechanical breakup for product. Advantageously, interrupter 1150 further enhances mechanical breakup of product by causing additional colliding flow paths.

An actuator according to the present disclosure is molded as a single piece structure and made from recyclable material. Because an actuator according to the present disclosure archives a better breakup of product, there is less waste. Thus, an actuator according to the present disclosure is environmentally friend.

A variety of products such as paints, insecticides, hair sprays, and various housekeeping products can dispensed from pressurized aerosol dispensers with an actuator according to the present disclosure.

While the present disclosure has been described with reference to one or more exemplary embodiments, it will be understood by those skilled in the art, that various changes can be made, and equivalents can be substituted for elements thereof without departing from the scope of the present disclosure. In addition, many modifications can be made to adapt a particular situation or material to the teachings of the present disclosure without departing from the scope thereof. Therefore, it is intended that the present disclosure will not be limited to the particular embodiments disclosed herein, but will include all aspects falling within the scope of a fair reading of the present disclosure.

The invention claimed is:

1. A one-piece molded actuator for a valve, the actuator comprising:

a ramp structure providing a linear sloping passageway communicating with the valve, the ramp structure having an opening at an end opposite the valve;

a chamber having a forward face adjacent to the ramp structure, the chamber communicating with the ramp structure at the opening, the chamber having an interior planar surface that receives a product flow from the ramp structure, wherein the opening is sized not to restrict product flow from the ramp to the chamber and the opening is configured to direct product flow from the ramp to strike the interior planar surface of the chamber to cause an initial mechanical breakup of product in the chamber, wherein the chamber is configured to generate a vortex and cause further mechanical breakup of the product; and a nozzle communicating with the chamber to dispense and cause further mechanical breakup of the product upon actuation of the valve, wherein the ramp structure is angled 28° to 50° relative to the forward face of the chamber as measured from a top-down vertical view and sloped at an angle from 20° to 30°.

2. The actuator of claim 1, wherein the ramp structure is tubular.

3. The actuator of claim 1, wherein the nozzle is round and offset from the chamber by a conduit.

4. The actuator of claim 1, wherein the nozzle is oriented at an angle relative to a central axis.

5. The actuator of claim 1, wherein the nozzle is rectangular.

6. The actuator of claim 5, wherein the nozzle has two offset rectangular planar openings of which one is larger than the other.

7. The actuator of claim 1, wherein the nozzle has an opening that has an area from 0.2 mm to 0.45 mm.

8. The actuator of claim 1, wherein the ramp structure is angled from 28° to 34° as measured from a top-down vertical view relative to the forward face of the chamber.

9. The actuator of claim 1, wherein the chamber comprises two or more low pressure zones.

10. The actuator of claim 1, wherein the ramp structure is angled 30° as measured from a top-down vertical view relative to the forward face of the chamber.

11. The actuator of claim 1, wherein the chamber comprises a diverter.

12. The actuator of claim 1, wherein the chamber comprises a flow channel.

13. The actuator of claim 1, wherein the chamber comprises an interrupter.

14. The actuator of claim 1, wherein the valve has, along its axial extent, an overall diameter, and wherein the chamber has a diameter that is less than the overall diameter of the valve.

15. The actuator of claim 1, wherein the valve has, along its axial extent, an overall diameter, and wherein the chamber has a diameter that is equal to the overall diameter of the valve.

16. A one-piece molded actuator for a valve, the actuator comprising:

a ramp structure providing a linear sloping passageway communicating with the valve, the ramp structure having an opening at an end opposite the valve;

a chamber having a forward face, the chamber communicating with the ramp structure at the opening, the chamber having an interior planar surface that receives a product flow from the ramp structure, wherein the opening is sized not to restrict product flow from the ramp to the chamber and the opening is configured to direct product flow from the ramp to strike the interior planar surface of the chamber to cause an initial mechanical breakup of product in the chamber, wherein the chamber is configured to generate a vortex and cause further mechanical breakup of the product; and a nozzle communicating with the chamber to dispense and cause further mechanical breakup of the product upon actuation of the valve, wherein the nozzle is rectangular and has two offset rectangular planar openings of which one is larger than the other, and wherein the ramp structure is angled 20° to 60° relative to the forward face of the chamber.

17. The actuator of claim 16, wherein the ramp structure is tubular.

18. The actuator of claim 16, wherein the ramp structure is sloped at an angle from 15° to 40°.

19. The actuator of claim 16, wherein the nozzle is oriented at an angle relative to a central axis.

20. The actuator of claim 16, wherein the nozzle has an opening that has an area from 0.2 mm to 0.45 mm.

21. The actuator of claim 16, wherein the ramp structure is angled from 28° to 34° relative to the forward face of the chamber.

22. The actuator of claim 16, wherein the chamber comprises two or more low pressure zones.

23. The actuator of claim 16, wherein the chamber comprises at least one structure selected from the group consisting of: a diverter, a flow channel, and an interrupter.

24. The actuator of claim 16, wherein the valve has, along its axial extent, an overall diameter, and wherein the chamber has a diameter that is less than the overall diameter of the valve.

25. The actuator of claim 16, wherein the valve has, along its axial extent, an overall diameter, and wherein the chamber has a diameter that is equal to the overall diameter of the valve.

* * * * *